Figure 1:
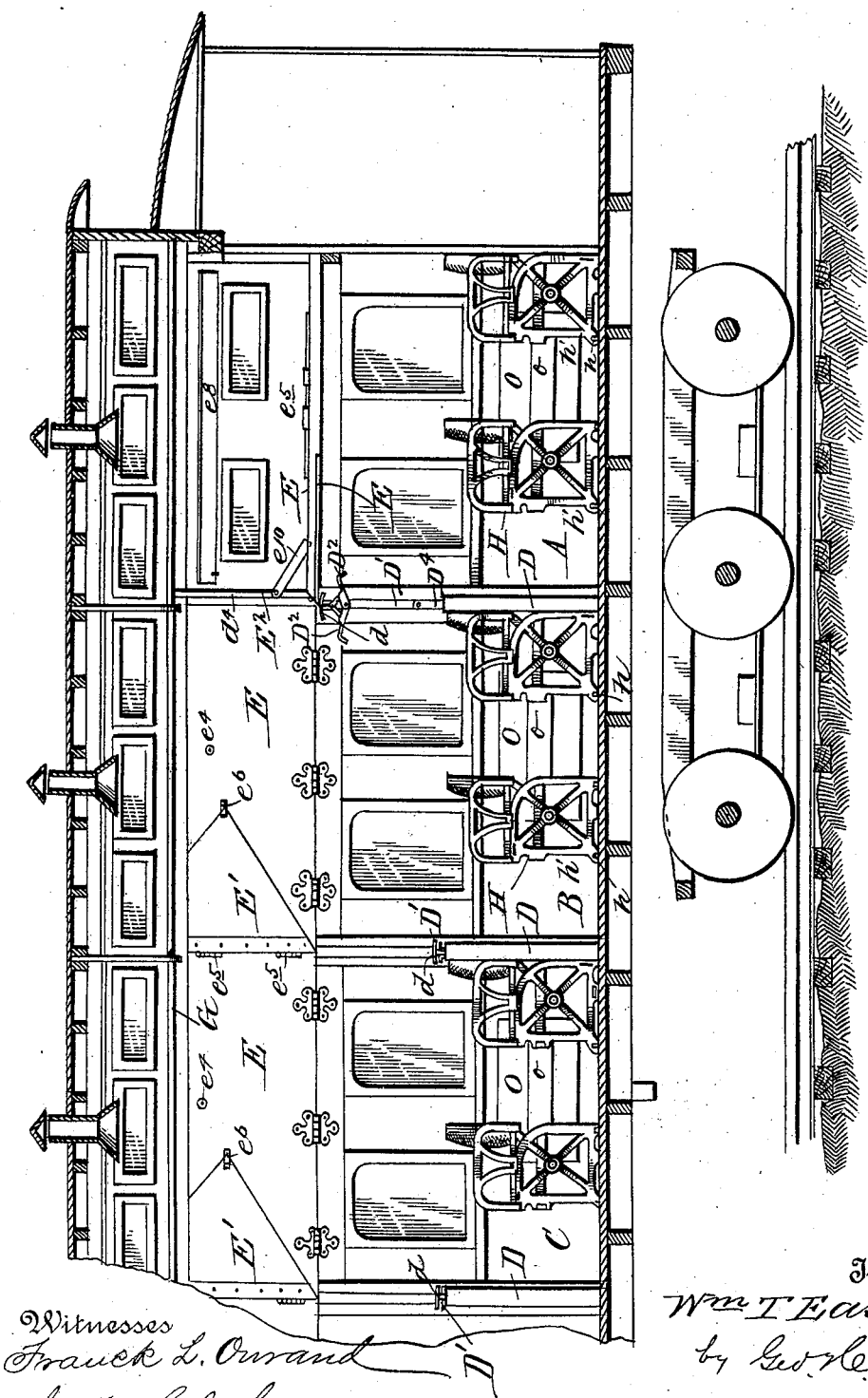

No. 615,689. Patented Dec. 13, 1898.
W. T. EASTES.
COMBINED DAY AND SLEEPING CAR.
(Application filed July 16, 1898.)
(No Model.) 7 Sheets—Sheet 1.

Witnesses
Franck L. Ourand
Geo. M. Copenhaver.

Inventor.
Wm T Eastes
by Geo. H. Evans
Attorney.

No. 615,689. Patented Dec. 13, 1898.
W. T. EASTES.
COMBINED DAY AND SLEEPING CAR.
(Application filed July 16, 1898.)

(No Model.) 7 Sheets—Sheet 3.

Witnesses:
Franck L. Ourand
Geo. M. Copenhaver

Inventor:
Wm. T. Eastes.
by Geo. H. Evans
Attorney

No. 615,689. Patented Dec. 13, 1898.
W. T. EASTES.
COMBINED DAY AND SLEEPING CAR.
(Application filed July 16, 1898.)

(No Model.) 7 Sheets—Sheet 5.

Witnesses
Franck L. Orrand
Geo. N. Copenhaver

Inventor:
Wm. T. Eastes.
by Geo. H. Evans
Attorney.

THE NORRIS PETERS CO., PHOTO-LITHO., WASHINGTON, D. C.

No. 615,689. Patented Dec. 13, 1898.
W. T. EASTES.
COMBINED DAY AND SLEEPING CAR.
(Application filed July 16, 1898.)
(No Model.) 7 Sheets—Sheet 6.
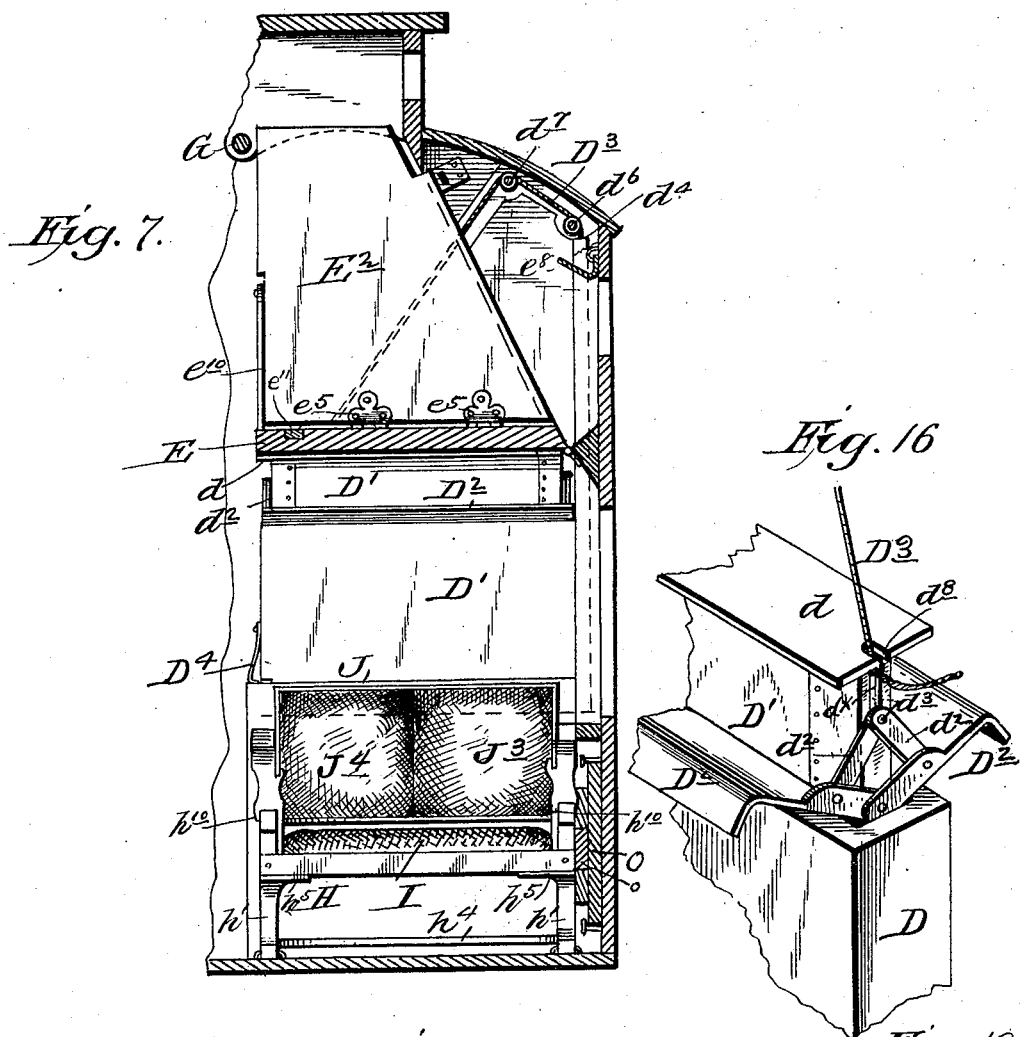
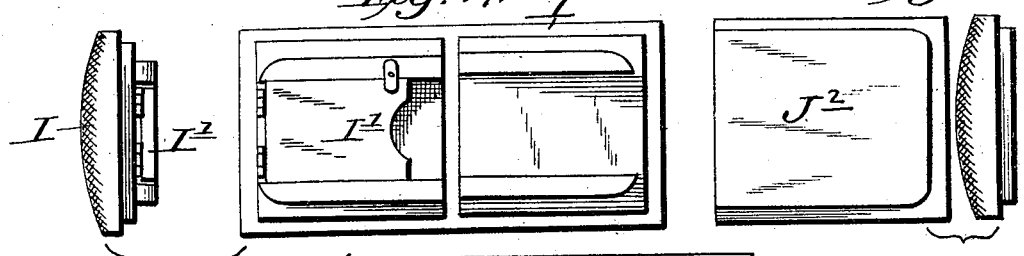

No. 615,689. Patented Dec. 13, 1898.
W. T. EASTES.
COMBINED DAY AND SLEEPING CAR.
(Application filed July 16, 1898.)
(No Model.) 7 Sheets—Sheet 7.
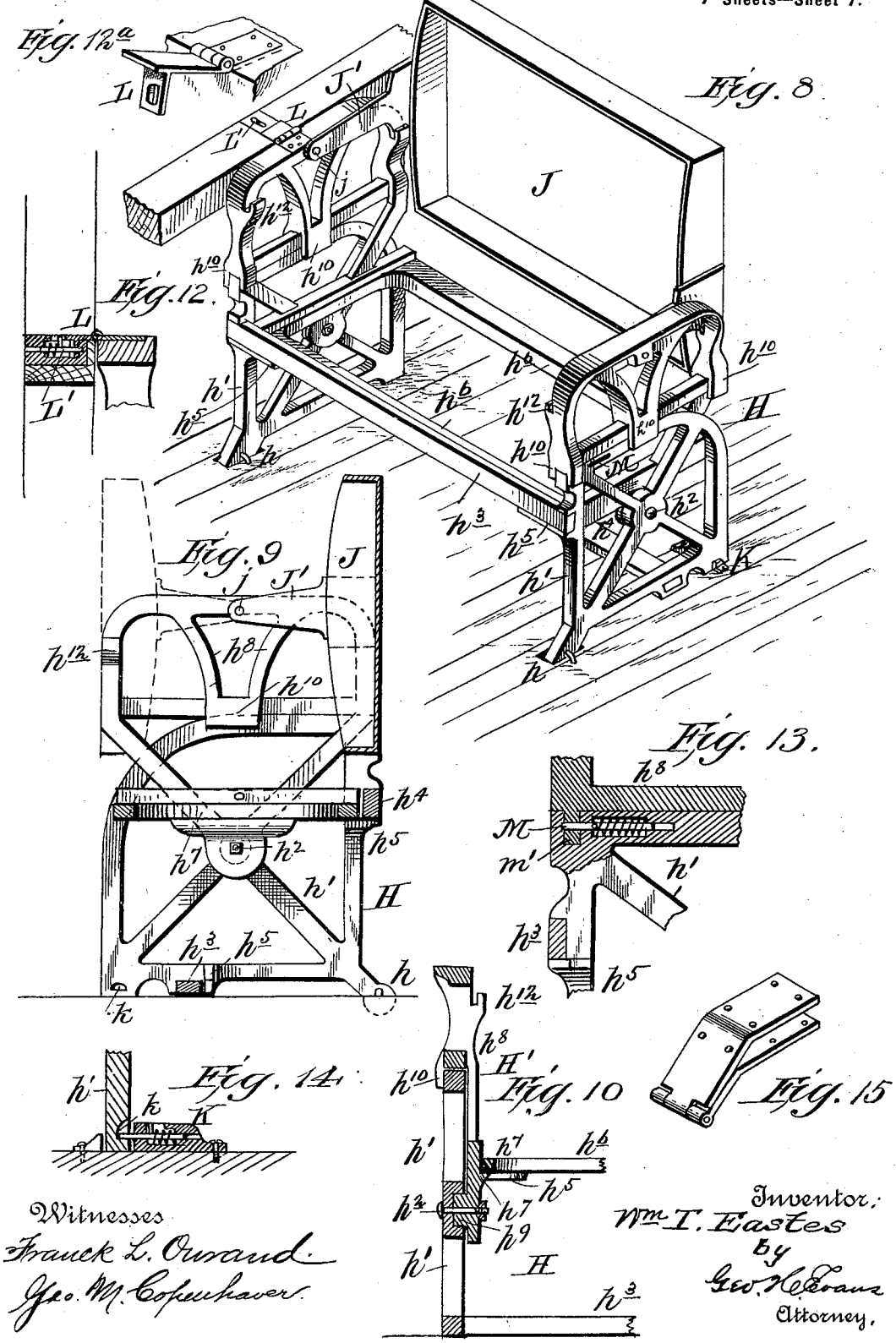

UNITED STATES PATENT OFFICE.

WILLIAM T. EASTES, OF MUNCIE, INDIANA, ASSIGNOR OF ONE-HALF TO FRANCIS M. HAYDEN, OF SAME PLACE.

COMBINED DAY AND SLEEPING CAR.

SPECIFICATION forming part of Letters Patent No. 615,689, dated December 13, 1898.

Application filed July 16, 1898. Serial No. 686,133. (No model.)

*To all whom it may concern:*

Be it known that I, WILLIAM T. EASTES, a citizen of the United States of America, residing at Muncie, Delaware county, Indiana, have invented certain new and useful Improvements in a Combined Day and Sleeping Car, of which the following is a specification.

It is well known that the ordinary day passenger-car is incapable of being converted into a sleeper and also that the sleeping-car is unsuitable for a day-car by reason of its seats being rigid and facing each other in pairs, so that one-half of the passengers are compelled to ride sitting backward. It is also well known that when the lower berth of a sleeper is made up it occupies the full area of the compartment and that there is no standing or sitting space within the compartment.

The objects of the invention are as follows: to provide a car capable of use as a day-car and as a sleeper by reason of the seat-frames being carried by adjustable bases and mounted to swing thereon, the backs being adapted to swing on the seat-frames, so that the seats may all be made to face in the same direction toward either end of the car or the pair of seats in any compartment may be made to face each other when such compartment is brought into use.

Further objects are to so construct and arrange the seat backs and bottoms which form the bed-bottom that one-half of the bed, full length, may be made up, leaving two seats for persons to sit upon, with the intervening space left open for standing-room or play-space for children, or the bed may be made up three-quarters in area and a single seat provided, with standing-room, or a bed full width and half length may be made up for children to play on and gain access to one window, while one full double seat remains, with a space between it and the adjacent end of the seats forming the bed; also, to provide a crib by swinging a seat-base toward one adjacent wall or end of the compartment to bring the seat close thereto and then reversing the back only to form that side of the crib opposite to the closed side formed by the partition or end wall of the compartment; also, to provide a vertically-sliding partition between each pair of seats and adapted to be raised above the seats to form a compartment either in connection with the downwardly-swinging upper berth or in connection with a hinged leaf carried by said berth when the latter is closed; to provide a swinging leaf to close the end of the upper berth when said berth is swung down; to provide means for raising such sliding partition either by hand or from the upper berth when the latter is being swung down, and to provide such vertically-sliding partition with shelves which will automatically open when the partition is raised and be similarly closed when the partition is lowered into its box between the two pairs of seats.

The above objects are accomplished by the mechanism illustrated in the accompanying drawings, in which—

Figure 2:
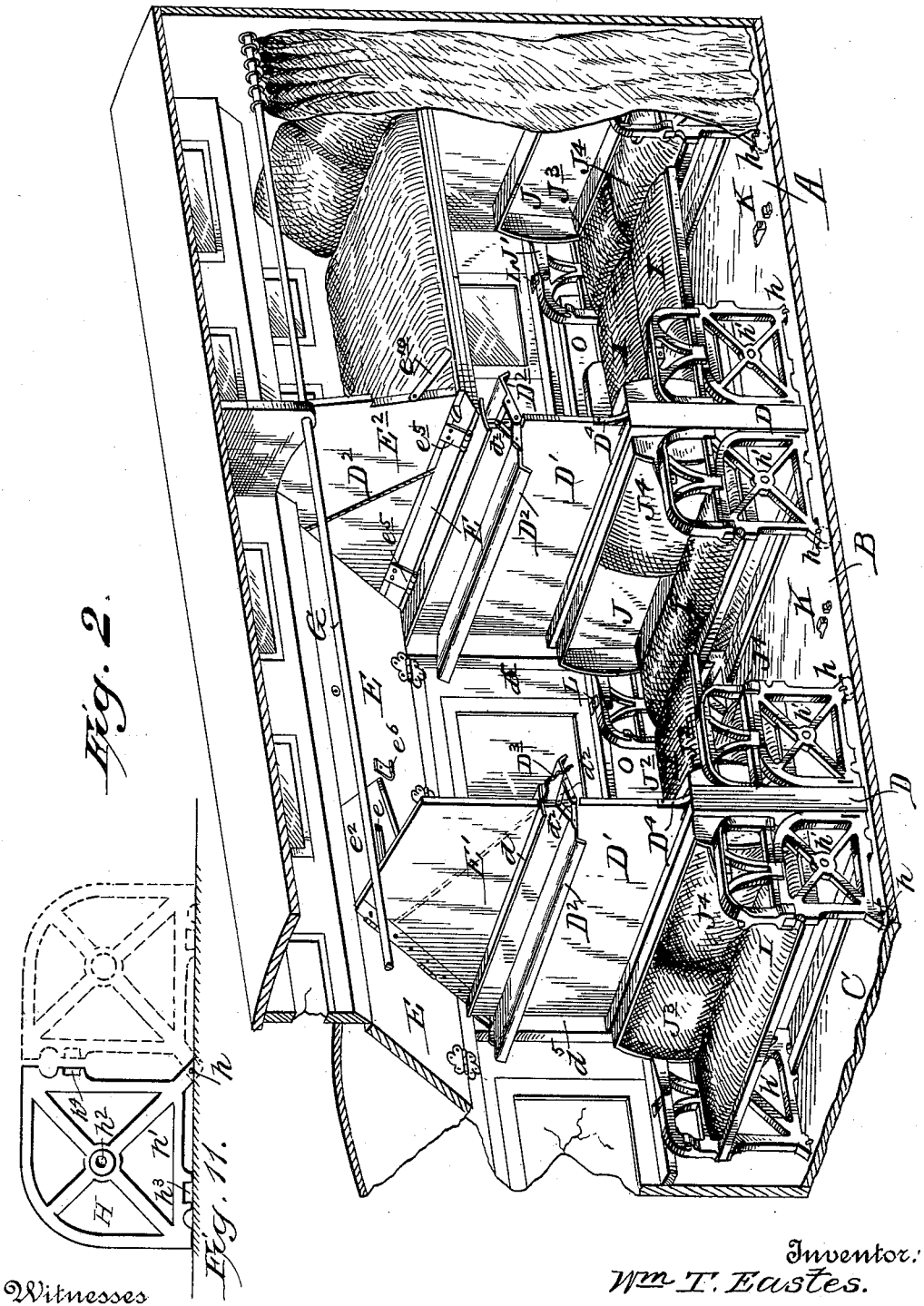
Figure 3:
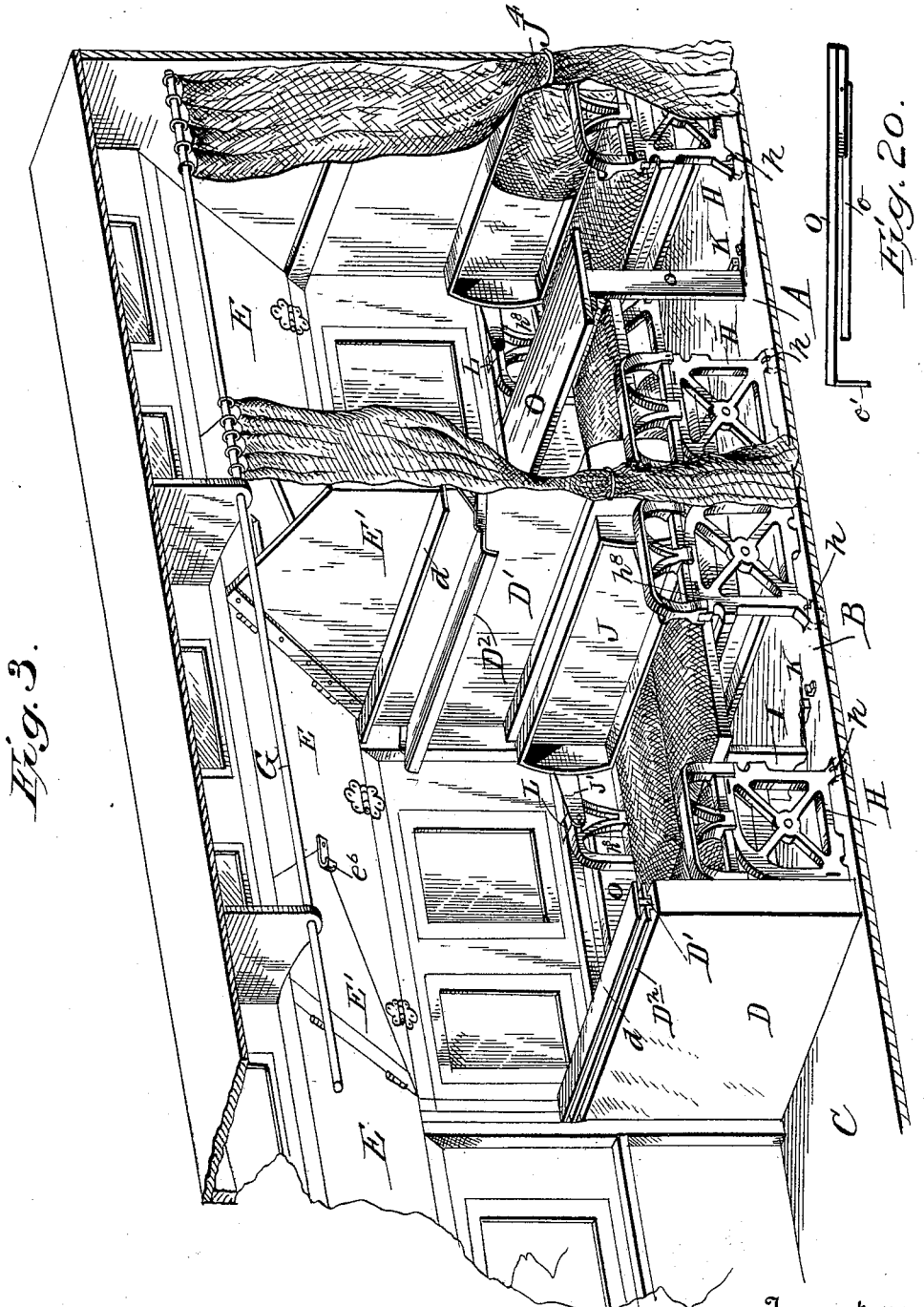
Figure 4:
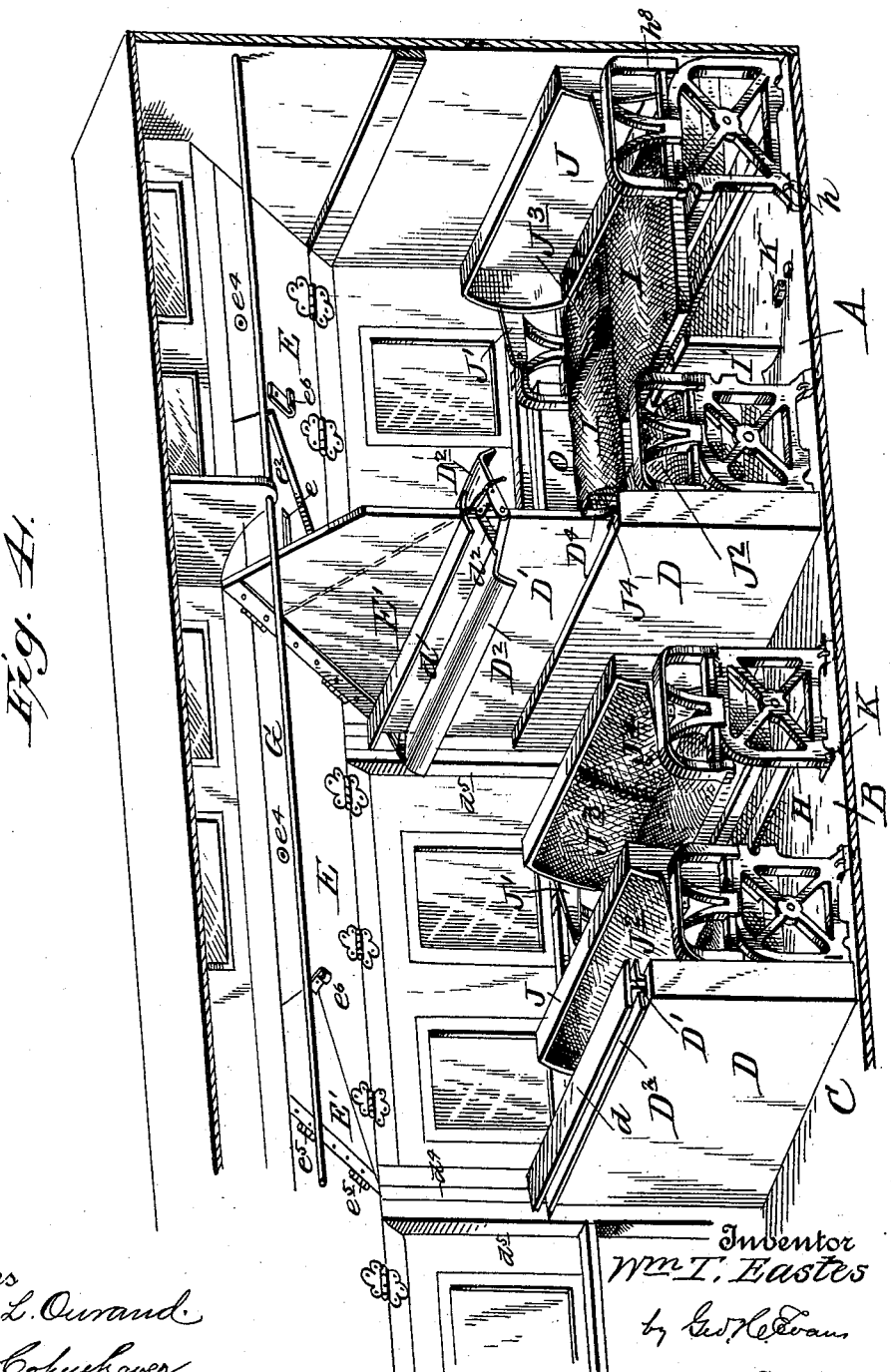
Figure 5:
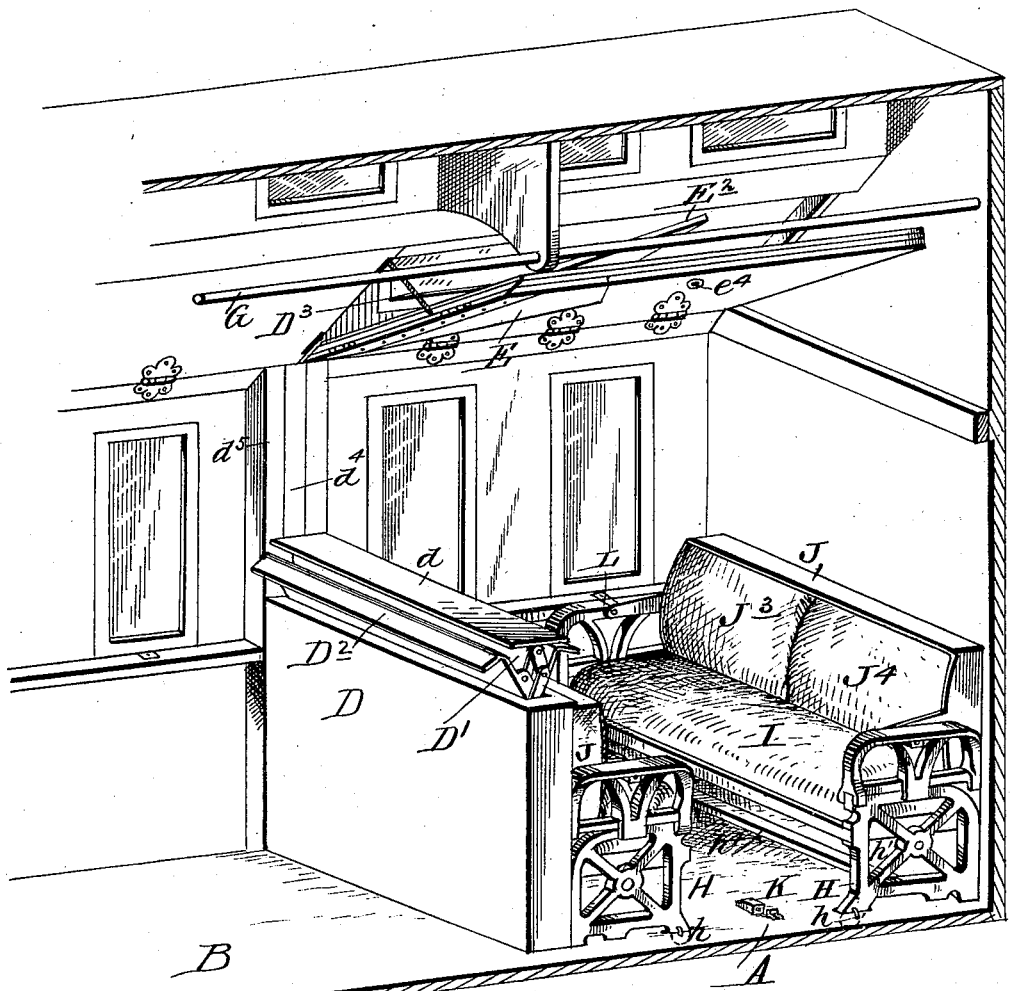
Figure 6:
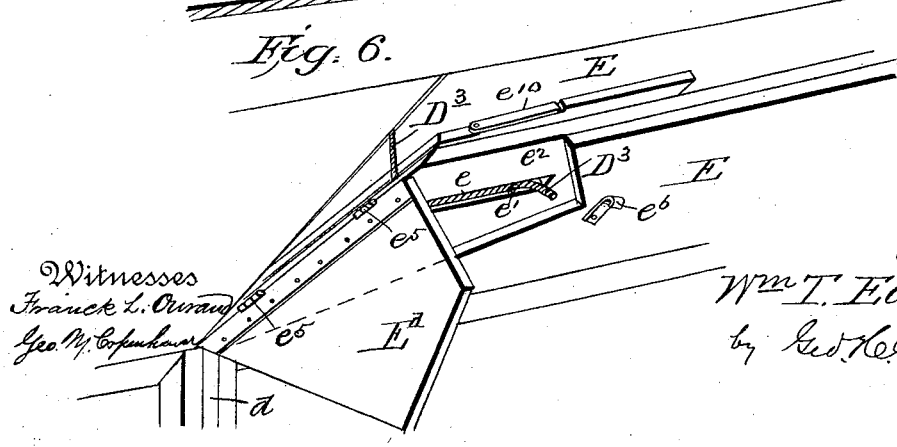

Figure 1 shows a central vertical longitudinal section of one end of my improved car with the seats facing in the same direction for use as a day-car, the right-hand partition being slid up and the lower hinged leaf on the upper berth swung down to form a compartment. Fig. 2 is a perspective of the same, showing upper and lower berths of the right-hand compartment in use as they are commonly made up in ordinary sleepers, the next compartment having the upper berth made up full length and one-half width, thus leaving two seats next to the aisle and a standing-space between them. Fig. 3 is a similar view with the right-hand compartment arranged with the bed full length and one-half width and the table crossing the bed for use by an invalid, space being afforded for walking around the outer end of the table and sitting at opposite sides of such outer end, the left-hand compartment having one end open and the bed made up full width and one-half length, so that a space will be afforded for the occupants of the seat at the left of such compartment. Fig. 4 is a similar view with the bed in the right-hand compartment made up three-quarters in area, so that a single seat will be left, with a space between it and the end of the shorter outer section of the bed, the left-hand compartment having the seats arranged so that a crib is formed by one seat and the other seat adjusted toward the crib, so that a mother or nurse may sit there and look after the child. Fig. 5 is a perspective of one compartment, showing the partition in the act of rising due to the pulling down of the upper berth. Fig. 6 is a detail view to better show the arrangement of the upper and lower leaves hinged to the upper berth. Fig. 7 is a transverse section through a compartment and upper berth, looking toward the vertically-sliding partition and upper hinged leaf. Figs. 8 to 14 are views of the improved seat and portions thereof. Fig. 15 is a perspective of the hinge of the lower hinged leaf E'. Fig. 16 is a detail view of the upper forward corner of the sliding partition, showing how its operating-cord is connected at its free end to the partition after raising same and also showing the shelves in their open position. Figs. 17 and 18 are detail views of a seat-bottom and back-section. Fig. 19 is a plan of the sectional mattress, which has been omitted from the other figures for purposes of clearness. Fig. 20 is an edge view of table O with its leg folded.

A B C designate successive compartments at one side of the aisle, and within each compartment there are two seats, the construction of which will be presently described. The compartments are divided off by means of a hollow section or box D between every pair of seats, which box at its upper end is about flush with the upper edges of the seat-backs, so that when the vertically-sliding partition D' is lowered down into the box and the seats all turned to face in the same direction an ordinary day passenger-car is formed, as shown in Fig. 1. The upper edge of the sliding partition D' is provided with a plate $d$, which closes the open upper end of the box D when the partition is lowered.

$D^2$ $D^2$ are angle-shelves hinged at their ends to the end edges of the upper end of partition D' to swing outwardly by gravity when the partition is raised and to close inwardly against the partition when the latter is lowered into its box, the outer flanged edges of the shelves then lying against the overhanging edges of the top plate $d$. The outward movement of the shelves is limited by links $d^2$, pivoted at one end to the respective shelves and pivoted together at their opposite ends, with such pivot $d^3$ sliding in the slot $d^\times$, formed in the partition D'. (See Figs. 2, 4, and 16.) The rear vertical edge of the partition D' is provided with an upright rod or bar $d^4$, which slides and is guided in a groove or way $d^5$ in the car-body, so as to prevent the partition from inclining and wedging when being raised or lowered, and to the upper end of this bar $d^4$ is connected a cord or chain $D^3$, which extends forwardly over pulleys $d^6$ $d^7$ in the top of the car and thence downwardly to the end edge of the upper berth E, where it enters a groove $e$ (see Fig. 6) and is detachably secured by a pin or other device $e'$. This upper berth E is hinged at its inner or lower longitudinal edge to the car-body, as usual, and may be swung down into a horizontal position when unlocked by inserting a proper key into the keyhole $e^4$ to actuate the bolts $e''$ of any approved construction.

The outer face of the berth E at the end next to partition D' is rabbeted or recessed, as shown at $e^2$, to receive the downwardly-swinging lower leaf E', hinged at one edge to the berth, as shown at $e^5$, and held closed in the recess $e^2$ by any suitable catch, as $e^6$, and when so closed serving to cover the groove $e$ and the end of the cord $D^3$ therein.

The downwardly-swinging leaf E is shaped to close the space above the sliding partition D' when the latter and the upper berth E are both raised, as shown in Fig. 2 between compartments B C and in Fig. 3 between compartments A and B. When this adjustment is to be effected, the catch $e^6$ is first released and the leaf E' swung down, whereupon the end of cord or chain $D^3$ is released from pin $e'$, and the operator now pulls on the said cord till the upper edge of the partition D' engages the lower transverse edge of the leaf E', (see Figs. 2 and 3,) and the cord is caught in the notch $d^8$ to hold the partition raised. A spring-catch $D^4$ on the outer edge of the partition will at this time snap over the upper end edge of the box D and assist in holding the partition raised, as shown in Figs. 2 and 7. By means of this sliding partition D' and hinged leaf E' a compartment may be formed at any time without lowering the upper berth E, and this compartment may be closed at the aisle side by means of the usual curtains F, hung on the rod G and carried when removed in the upper berth. In this condition of the compartment the lower bed may be made up or the seats adjusted in any of the various ways shown in the drawings and more fully described hereinafter.

If the upper berth E is to be swung down, as in compartment A, Figs. 1 and 2, it is first unlocked and in being drawn down will pull on cord $D^3$ and raise the partition D', as shown in Figs. 1, 5, and 7.

In order that the space at the end of the berth E may be closed when the berth is let down for use, I provide it with an upper hinged leaf $E^2$, adapted to be swung up into vertical position, as shown in Fig. 7, and in Figs. 1 and 2 compartment A. In this position the leaf $E^2$, as was the case with leaf E', will lie in the vertical plane of the sliding partition D'. The leaf $E^2$ is held in its open position by any suitable brace $e^{10}$ or other devices. The bedding of the upper berth is of the usual kind. The upper berth is provided with a swinging shelf $e^8$, as usual. (See Fig. 7.)

I will now describe the seat by which the various changes in the lower berth are effected.

Each seat comprises a rectangular base H, hinged at the lower ends of one corner to the floor, as shown at $h$, so as to swing from the position shown in dotted lines, Fig. 11, to that shown in full lines or from the position shown at the right in compartment A, Fig. 4, to that shown to the right in compartment B, same figure. This reversal of the base H also allows all of the seats to be reversed from the positions shown in Fig. 1, so as to face the opposite end of the car. Moreover, even the end seat next to the closets may be reversed, so that the passenger may face in the direction in which the car moves. The base comprises two rectangular end pieces $h'$ $h'$, the corners of which, diagonally opposite the pivots $h$, are curved concentric with the axes $h^2$ of the seat-frames H'. The two end pieces $h'$ $h'$ are connected by longitudinal bars $h^3$, at the ends of the inner faces of which are formed rests $h^5$ $h^5$ for the respective edges of the swinging seat-frame H'. (See Figs. 9, 10, and 13.)

The seat-frame H' comprises the open horizontal rectangular frame $h^6$ for supporting the upholstered seat I, and this frame $h^6$ rests at its ends on the transverse ribs $h^7$, formed across the inner faces of the arms $h^8$ of the seat-frame, just above the round pivotal lugs $h^9$ thereof, which turn in round bearing-recesses on the inner faces of the base ends $h'$, as shown in Fig. 10. These arms $h^8$ are formed with lips $h^{10}$, which overlap or straddle the edges of the base ends $h'$, the middle lips serving to straddle the curved edges of the base ends, at which time the end lips are out of contact with the base ends.

J is the box-like seat-back frame, pivoted by its arms J' to the upper edge of the seat-arms $h^8$, as shown at $j$, and resting alternately on lugs $h^{12}$ at opposite sides of the pivots $j$.

$J^2$ are the upholstered seat-backs, held removably in the hollow or box-like backs, and one of these backs is made in two sections $J^3$ $J^4$.

The two seats I are provided at their under sides with a hinged leg I', (see Fig. 17,) so that when the seats are used to form the beds in Figs. 3 and 4—compartments B and A, respectively—their free ends will receive proper support.

Between each pair of seats in a compartment a catch K is placed on the floor (see Figs. 2, 3, 4, and 14) to engage a notch $k$ in the end frame of whichever seat-base is swung into engagement therewith and hold same from tilting. A further preventive against the seat tilting from jolting is afforded by the hasp L, mounted on the inner seat-arm and engaging a catch L' on the car-frame. (See Figs. 8, 12, and 12ª.) The swinging seat-arms $H^8$ will also be locked against swinging on the base H' when the parts are in the position shown in dotted lines, Fig. 9, by means of a spring-bolt M, (see Fig. 13,) mounted in the base end and engaging an apertured lug $m'$ on the swinging arm $h^8$.

Every compartment has a table O, mounted removably on the side of the car at the inner ends of the seats and provided with a hinged leg $o$ at one end and the hook $o'$ at its other end to engage the side of the car in the usual manner. The table may be used when one-half of the bed is made up, as in compartment A, Fig. 3, where it will prove of great convenience should an invalid occupy the bed. Space is afforded between the two end seats for the outer end of the table. Heretofore the table could only be used prior to making up the bed.

The advantages of the present invention will be apparent to any one used to traveling and also to railway officials, for the railway company may now operate its own sleepers instead of running the cars of sleeping-car companies over its line, since my car may be adjusted for a day-car as well as a sleeper.

A compartment may be fitted for private use at any point on the line and tickets may be sold therefor at any station. The arrangement of the seats allows the bed of the lower berth to be made up in the several ways set forth in the description of Figs. 2, 3, and 4, so that greater comfort and facilities will be afforded invalids and children during transit, and this will be obvious when the trouble and annoyance of carrying an invalid to the closet at the end of the car is considered, for with my invention there is room in the compartment, as in B, Fig. 2, for the reception of a commode at the same time that the bed is made up in its single form.

In Fig. 2, compartment A, the two seats I I are removed and laid from edge to edge of the seat-frames, and the backs $J^2$, $J^3$, and $J^4$ are laid in the seat-frames, and thus the entire bed of the lower berth is made up ready for the entire mattress P. (Shown in Fig. 19.) In compartment B, same figure, and compartment A, Fig. 3, the seats I I are in their frames, and the back $J^2$ is laid from one seat-frame to the other, at the window ends thereof, and the inner back-section $J^3$ is placed in the opposite back-frame J directly opposite the back-section $J^4$.

In making up the bed, as in compartment B, Fig. 3, both seats I I are removed and placed side by side crosswise of the right-hand seat-frame and their inner ends extending under the lower edge of the back-frame J. The back-sections $J^2$ $J^3$ are removed from this frame and placed in the opposite seat-frame and afford seats for two, while the bed affords ample room for children to play on and to gain access to the window.

In Fig. 4, compartment A, one seat I is placed with its ends on the seat-frame, as in A, Fig. 3, and the other seat I is placed as in B, Fig. 3. The back $J^2$ is placed in one seat-frame, a back-section $J^3$ is placed in the inner end of the opposite seat-frame, and the back-section $J^4$ is placed in the outer end of the opposite back-frame J for the occupant of the single seat to lean against.

In compartment B, Fig. 4, both seat-bases H are swung toward the same end of the compartment and both seat-backs face in the same direction, and this forms a crib and a seat for the parent or nurse. By swinging the right-hand base-seat away from the crib a larger space between the two will be provided.

By reason of the swinging bases H and swinging seat-frames and back-frames thereof the seats may be bodily moved away from and toward either end of the compartment, and the seats may be made to face forward or backward or toward each other, as may be desired.

A traveling party may be given a private compartment any time, if desired, and the occupants may face each other or not, as desired, or some may lie down and others sit upright.

What I claim is—

1. In a car, the combination with a casing and vertically-sliding partition of a height to close the space above the seats to about where the roof curvature or angle begins, of a non-apertured leaf hinged at the roof-line to swing down and register at its lower edge with the upper edge of the partition and complete the closure of the compartment, substantially as described.

2. In a car, a vertically-sliding partition, in combination with a downwardly-swinging upper berth and operative connections between the berth and the partition whereby the downward movement of the berth will raise the partition.

3. The combination with the vertically-sliding partition and its case or box, of a downwardly-swinging upper berth having a downwardly-swinging hinged leaf to register with the upper end of the partition when said upper berth is closed.

4. The combination with the vertically-sliding partition and its casing of a downwardly-swinging berth having a downwardly-swinging hinged leaf on its lower side and an upwardly-swinging leaf on its upper side.

5. The combination with the vertically-sliding partition, a casing therefor, and a cord or chain for raising and lowering the partition, of the downwardly-swinging berth having a recess or rabbet on its lower face provided with a groove for detachably receiving the free end of such cord or chain, and a hinged lower leaf mounted in said recess or rabbet.

6. The combination with the box or casing open at its upper end, of a vertically-sliding partition having a hinged receptacle-forming shelf near its upper end out of the path of the upper berth adapted to enter and be closed by said casing in the downward movement of the partition and constructed to swing outwardly when the partition is raised.

7. The combination with the casing or box open at its upper end, and a vertically-sliding partition, of hinged shelves at opposite sides of such partition and opened and closed by the action thereof, and links pivotally connecting said shelves and pivoted together in sliding connection with the edge of the partition.

8. The combination with the box or casing open at its top and the partition sliding therein and having a plate on its upper end to close the open top of the box or casing, of swinging flanged shelves at opposite sides of the partition and opened and closed by the operation thereof; the flanges of the shelves lying under the overhanging edge of the top plate of the partition when the partition is lowered.

9. The combination in a car, of a series of seats each comprising a reversible base adapted to be moved toward and from the adjacent seat or end wall, a swinging seat-frame pivoted at its ends to the ends of the base and a swinging back pivoted to the arms of the seat-frame; whereby the seats may be made to face either end of the car and a space afforded between the seats and the adjacent end walls or partitions of the car.

10. The combination with a compartment of two seats therein each comprising a base hinged at one lower edge to the floor to swing toward and from the ends of the compartment, a reversible seat-frame hinged at its ends to the hinged base, and a back-frame pivoted at its ends to the end arms of the seat-frame, substantially as described.

11. The combination with a compartment, of opposed seat-frames, provided with removable non-sectional seats of a length to rest at their ends upon the adjacent edges of the seat-frames, and removable backs one of which is divided transversely into the two sections and the other non-divided; said backs and back-sections being of a size for insertion in the seat-frames and the seats being also adapted to rest on the front frame-bar if desired with their inner ends under the lower edge of the seat-back frame, substantially as described.

12. The combination with a compartment of seat supports or frames at the ends thereof and having removable seats proper each having a leg, and the box-like back-frames each having a removable back one of such backs being divided transversely into two disconnected sections, whereby a bed may be formed full length and half width with two sittings next the aisle, or full width and half length with one double sitting, or a bed three-quarters in area and a single sitting, substantially as described.

13. The combination with the compartment, of the bases hinged to the floor to swing toward and from the respective ends of the compartment, the seat-carrying frames hinged to the ends of the seat-bases, means for locking the said frames to the bases and to the side of the car, the hollow or box-like back-frames hinged to the arms of the seat-frames, seats removable from the seat-frames and provided with legs at one end, backs removable from the box-frames, and devices for locking the bases to the floor, substantially as and for the purposes described.

14. The combination with a car having compartments formed of boxes or casings, vertical partitions sliding in said boxes and an upper berth having a hinged lower leaf operating in connection with said partition, of two seats in every compartment having reversible bases hinged to the floor, swinging reversible seat-frames pivoted to the ends of the base and swinging reversible back-frames pivoted to the arms of the seat-frames, the top edges of the backs being about flush with the top edges of the partition-boxes whereby all of the seats may be faced in the same direction when the car is used as an ordinary passenger-car, and compartments formed for sitting and sleeping purposes, substantially as described.

15. The combination with a reversible base having means for hinging one lower edge to the car-floor, a horizontal seat-frame pivoted at its ends to the ends of the base to swing around to two sides thereof, and a reversible back swinging on the arms of the seat-frame.

16. The combination with the reversible base comprising connected end pieces provided at one lower corner with pivoting means and curved at diagonally opposite corners, supports at the inner sides of the end frames, at opposite sides of a line drawn through the base-pivots and curved corners, of the swinging seat-frames pivoted between the end frames concentric with their rounded corners to swing from one support to the other, lips on the seat-frame arms embracing the edges of the base ends, and a swinging back having arms pivoted to the upper middle portions of the seat-frame arms, substantially as described.

17. The combination with the swinging reversible bases, and the reversible seat-frames thereon provided with a removable seat, of the hollow or box-like back-frames having arms pivoted to the seat-frame arms to reverse thereon and a removable back in said box-like back-frame substantially as described.

In testimony whereof I affix my signature in presence of two witnesses.

WILLIAM T. EASTES.

Witnesses:
ALFRED S. WILLSON,
C. G. HEYLMAN.